United States Patent
Conner et al.

(10) Patent No.: US 9,221,552 B2
(45) Date of Patent: Dec. 29, 2015

(54) AIRCRAFT SYSTEMS AND METHODS FOR ATTITUDE RECOVERY

(71) Applicant: HONEYWELL INTERNATIONAL INC., Morristown, NJ (US)

(72) Inventors: Kevin J Conner, Kent, WA (US); Yasuo Ishihara, Kirkland, WA (US); Thea L. Feyereisen, Hudson, WI (US); John Allan Morgan, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 82 days.

(21) Appl. No.: 13/901,022

(22) Filed: May 23, 2013

(65) Prior Publication Data

US 2014/0218216 A1  Aug. 7, 2014

Related U.S. Application Data

(60) Provisional application No. 61/666,584, filed on Jun. 29, 2012.

(51) Int. Cl.
*G08B 23/00* (2006.01)
*B64D 45/00* (2006.01)
*G01C 23/00* (2006.01)

(52) U.S. Cl.
CPC .............. *B64D 45/00* (2013.01); *G01C 23/005* (2013.01)

(58) Field of Classification Search
CPC ......... G01S 17/023; G01S 17/89; B62D 1/28; B60T 2230/03; G02B 27/01; G01C 23/005; G01C 5/005
USPC ......... 340/967, 963, 970, 971, 973, 975, 977; 701/1, 3, 4, 5; 33/328
See application file for complete search history.

(56) References Cited

U.S. PATENT DOCUMENTS

| | | | | |
|---|---|---|---|---|
| 4,626,851 | A * | 12/1986 | Tooze | 340/975 |
| 4,825,194 | A * | 4/1989 | Rasinski | 340/975 |
| 5,095,746 | A | 3/1992 | Stanis | |
| 5,874,956 | A | 2/1999 | LaHood | |
| 6,150,960 | A | 11/2000 | Voulgaris | |
| 6,489,898 | B1 * | 12/2002 | Nicholls | 340/975 |
| 6,567,014 | B1 | 5/2003 | Hansen et al. | |
| 6,628,308 | B1 | 9/2003 | Greenberg et al. | |
| 6,933,859 | B2 | 8/2005 | Hurt et al. | |
| 7,218,245 | B2 * | 5/2007 | Wyatt et al. | 340/973 |
| 7,505,835 | B2 | 3/2009 | Brust et al. | |
| 7,571,878 | B2 | 8/2009 | Persson et al. | |
| 8,086,361 | B2 | 12/2011 | Conner et al. | |
| 8,354,943 | B2 * | 1/2013 | Bacabara et al. | 340/973 |
| 8,548,653 | B2 * | 10/2013 | Puig et al. | 701/18 |

(Continued)

OTHER PUBLICATIONS

Roust, L.M.; Evaluation of Head-Up Display Formats for the F/A-18 Hornet; Naval Postgraduate School, Monterey, CA, AD-A208651.

*Primary Examiner* — Kerri McNally
(74) *Attorney, Agent, or Firm* — Ingrassia Fisher & Lorenz, P.C.

(57) ABSTRACT

A vehicle system is provided. The system includes a processor configured to receive data representative of a current attitude and a desired attitude and to generate display signals associated with the current attitude and the desired attitude. The system further includes a display device configured to receive the display signals and operable to selectively render an image including roll angle alert symbology. The roll angle alert symbology includes a first curved arrow.

18 Claims, 8 Drawing Sheets

(56) References Cited

U.S. PATENT DOCUMENTS

| | | | |
|---|---|---|---|
| 8,654,236 B2 * | 2/2014 | Shiozaki | 348/333.02 |
| 2005/0012642 A1 * | 1/2005 | Sacle | 340/973 |
| 2008/0191903 A1 | 8/2008 | Dubourg et al. | |
| 2010/0305784 A1 | 12/2010 | Anderson et al. | |
| 2011/0172855 A1 | 7/2011 | Marstall et al. | |
| 2011/0205090 A1 | 8/2011 | Marstall et al. | |
| 2012/0154178 A1 | 6/2012 | Schmidt | |
| 2013/0096738 A1 * | 4/2013 | Yamasaki | 701/14 |

* cited by examiner

AIRCRAFT SYSTEMS AND METHODS FOR ATTITUDE RECOVERY

PRIORITY CLAIM

This application claims the benefit of U.S. Provisional Application No. 61/666,584, filed Jun. 29, 2012 and hereby incorporated by reference.

TECHNICAL FIELD

The present invention generally relates to aircraft system and displays, and more particularly relates to aircraft display systems and methods that assist in attitude recovery.

BACKGROUND

Aircraft and aircraft systems continue to advance in sophistication, particularly with respect to aircraft display systems. Flight instruments and associated displays are used on aircraft to integrate information from data sources and to perform, or assist a user in performing, functions related to, for example, flight planning, guidance and navigation, and performance management. The easier it is for the pilot to obtain and understand the information provided by these instruments and displays, the more likely that the pilot will be able to successfully navigate the aircraft.

One type of flight display system is an attitude indicator that informs the pilot of the orientation of the aircraft relative to earth. Such attitude indicators indicate the pitch (fore and aft tilt) and roll (side to side tilt) of the aircraft. Although attitude indicators are common in aircraft, any improvement that enhances situational awareness and control of the aircraft is beneficial.

Accordingly, it is desirable to provide improved aircraft display systems and methods. In addition, it is desirable to improved aircraft display systems and methods to assist in attitude recovery. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a vehicle system is provided. The system includes a processor configured to receive data representative of a current attitude and a desired attitude and to generate display signals associated with the current attitude and the desired attitude. The system further includes a display device configured to receive the display signals and operable to selectively render an image including roll angle alert symbology. The roll angle alert symbology includes a first curved arrow.

In accordance with another exemplary embodiment, a vehicle display method is provided. The method includes receiving data representative of a current attitude and a desired attitude for a vehicle; evaluating a roll alert condition of the vehicle; displaying, during the roll alert condition, a first curved arrow on an attitude indicator; and modifying, during the roll alert condition, an appearance of the first curved arrow.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include display aircraft systems and methods to provide attitude information in the form of an attitude display or indicator. In addition to displaying attitude, exemplary embodiments may evaluate the current attitude relative to a desired attitude, and if applicable, generate a roll angle alert during an excessive roll angle condition. During an excessive roll angle condition, the attitude indicators may include one or more arrows orientated in the appropriate direction of the corrective roll. Such arrows may be positioned in the attitude indicator above the wing symbology and/or below the wing symbology. In some embodiments, the arrows may be selectively displayed based on the pitch condition of the aircraft.

Figure 1:
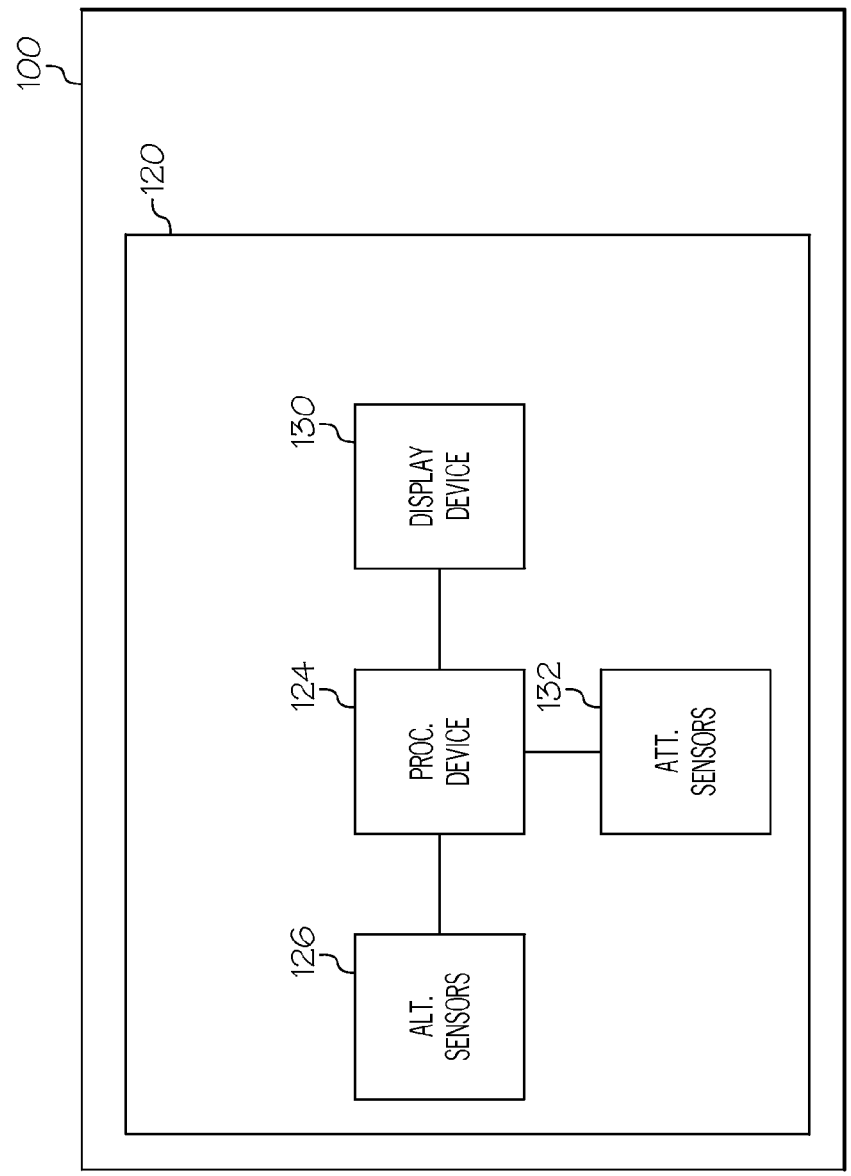
FIG. 1 is a block diagram of an aircraft system according to an exemplary embodiment.

FIG. 1 illustrates a schematic diagram of an exemplary aircraft system 120 for displaying the roll arrow symbology discussed in an aircraft 100 in greater detail below, as well as performing associated methods. Although an aircraft 100 is referenced, the system 120 may be associated with any of a number of different types of vehicles, such as helicopters, unmanned aircraft, or submarines. Exemplary embodiments may be embodied in software and/or hardware that is included in an existing system located on the aircraft 100. The aircraft system 120 may be associated with or form part of larger aircraft system, such as a flight management system (FMS) or a navigation system.

In the depicted exemplary embodiment, the system 120 may include a processing device 124 that is in signal communication with altitude sensors 126, attitude sensors 132, and display device 130. In general, the processing device 124 may include any suitable component for carrying out the functions described below, including a processor, memory, and one or more input and/or output device interfaces that are communicatively coupled together. As such, the processing device 124 may include a hardware device for executing software, particularly software stored in memory as an ordered listing of executable instructions for implementing logical functions. Such memory may include any one or combination of volatile memory elements (e.g., random access memory (RAM, such as DRAM, SRAM, SDRAM, VRAM, etc.)), and/or nonvolatile memory elements (e.g., ROM, hard drive, tape, CD-ROM, etc.). Any suitable input and output devices may be provided, including a keyboard, touchscreen mouse, scanner, microphone, and/or camera.

The altitude sensors 126 may be any one of or combination of existing altitude sensors, for example barometric altimeter, global positioning systems (GPS), radar altimeter (RAD-ALT), air data computer (ADC), or a geometric altitude calculated from information from the other types of altitude sensors. The attitude sensors 132 may broadly refer to roll-angle and pitch angle information sources, such as an inertial reference system (IRS), attitude and heading reference system (AHRS), separate gyroscopes, and/or other types of sources.

In one exemplary embodiment, the display device 130 may be, for example, a panel-mounted heads down display (HDD) used in avionics for displaying flight information, as discussed below. Moreover, the display device 130 may be any type of system, including a primary flight display system, a head up display as an overlay, or a head mounted display system, such as a "near to eye display" system. In general, the display device 130 may include any device or apparatus suitable for displaying flight information or other data associated with operation of the aircraft, including various types of computer generated symbols and information representing, for example, pitch, heading, flight path, airspeed, altitude, runway information, waypoints, targets, obstacle, terrain, and RNP data in an integrated, multi-color or monochrome form. In particular, the display device 130 may receive display signals from the processing device 124 to display the symbology and graphics discussed below.

In this embodiment, the display device 130 is located within a cockpit of the aircraft. It should be appreciated that, in practice, the display device 130 may be located outside the aircraft (e.g., on the ground as part of an air traffic control center or another command center). Although not shown, a user interface may also be provided and adapted to allow a user (e.g., pilot, co-pilot, or crew member) to interact with the system 120.

During operation, the processing device 124 receives altitude information from the altitude sensors 126 and attitude information from the attitude sensor 132, including vehicle roll angle information, roll angle rate information, pitch angle information, and/or pitch angle rate information. As used herein, the term "roll angle" may refer to the bank angle, e.g., the difference between the aircraft wings and horizontal. The processing device 124 may also receive information about a desired roll angle, which may be based on the flight condition. For example, the desired roll angle may be horizontal (or zero) or a non-horizontal value, such as during a flight transition. As such, the desired roll angle information additionally may be based on flight plan information provided to the processing device 124.

The processing device 124 determines if a roll angle alert condition exists and generates a roll angle alert signal based on the received altitude information, the roll angle information and/or the roll angle rate information. In one exemplary embodiment, the processing device 124 may evaluate the roll condition by comparing the current roll angle to a predetermined roll angle that may indicate an excessive roll condition. The predetermined roll angle may be any suitable roll angle, such as 40°, 45°, or 50°. In another exemplary embodiment, the processing device 124 evaluates the roll condition by comparing the current roll angle to the desired roll angle. If the current roll angle differs from the desired roll angle by more than a predetermined value, the processing device 124 may initiate a roll angle alert. Other factors may also be considered. As discussed below, the roll alert signal may also be based on the pitch angle information and pitch angle rate information.

As noted above, the processing device 124 then generates display commands representing this data, and sends display commands to the display device 130. The display device 130 and/or processing device 124 may include a graphics display generator for generating the appropriate symbology on the screen of the display device 130, as discussed in greater detail below. Particularly, the display device 130 may be an attitude indicator that displays current attitude as well as other flight information. As described below, such an attitude indicator may provide a warning or alert of an excessive roll condition. The symbology generated during the roll angle alert condition is described in greater detail below with reference to FIGS. 2-7.

Figure 2:
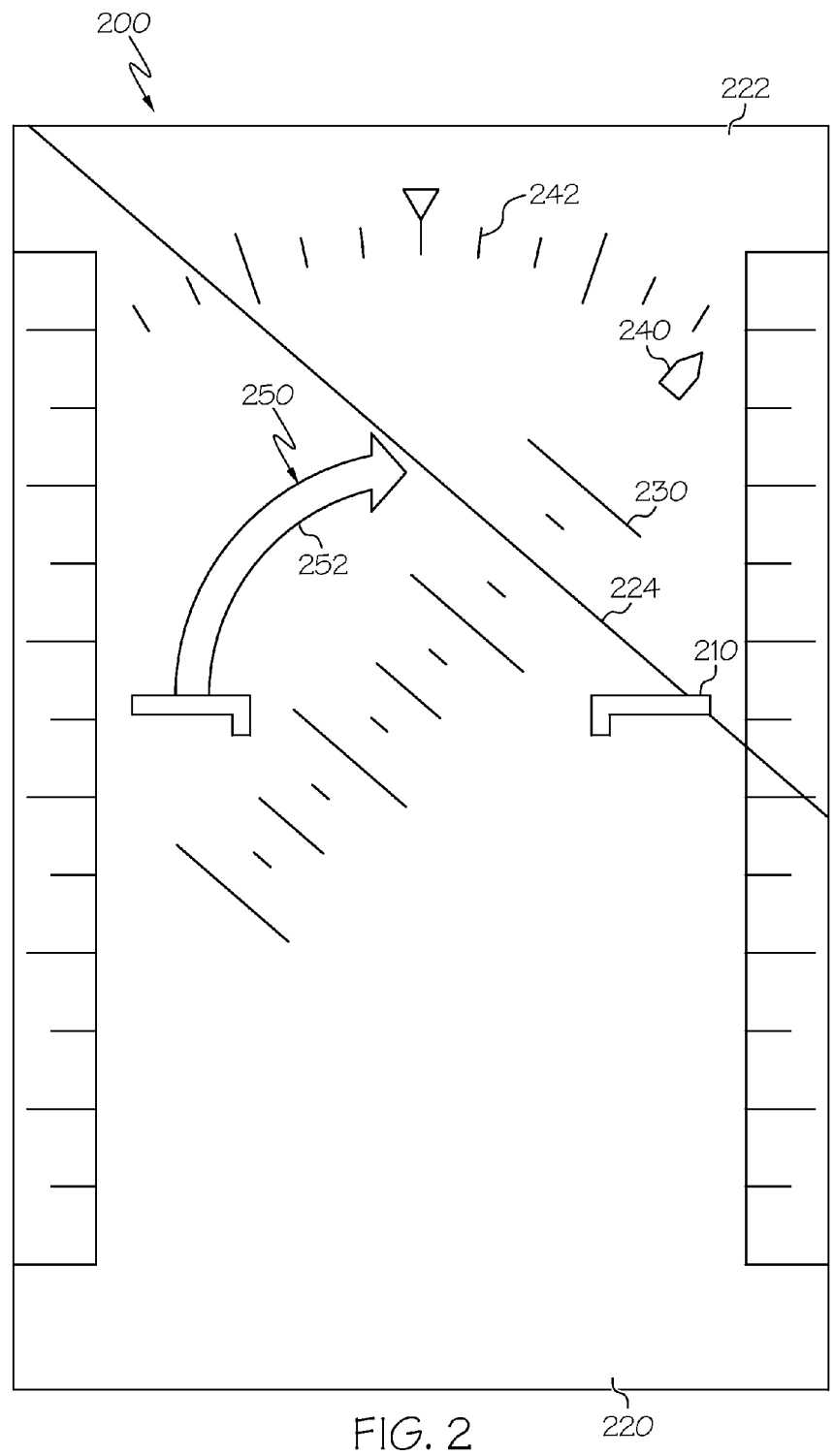
FIG. 2 is an image generated by the aircraft system of FIG. 1 according to an exemplary embodiment.
Figure 3:
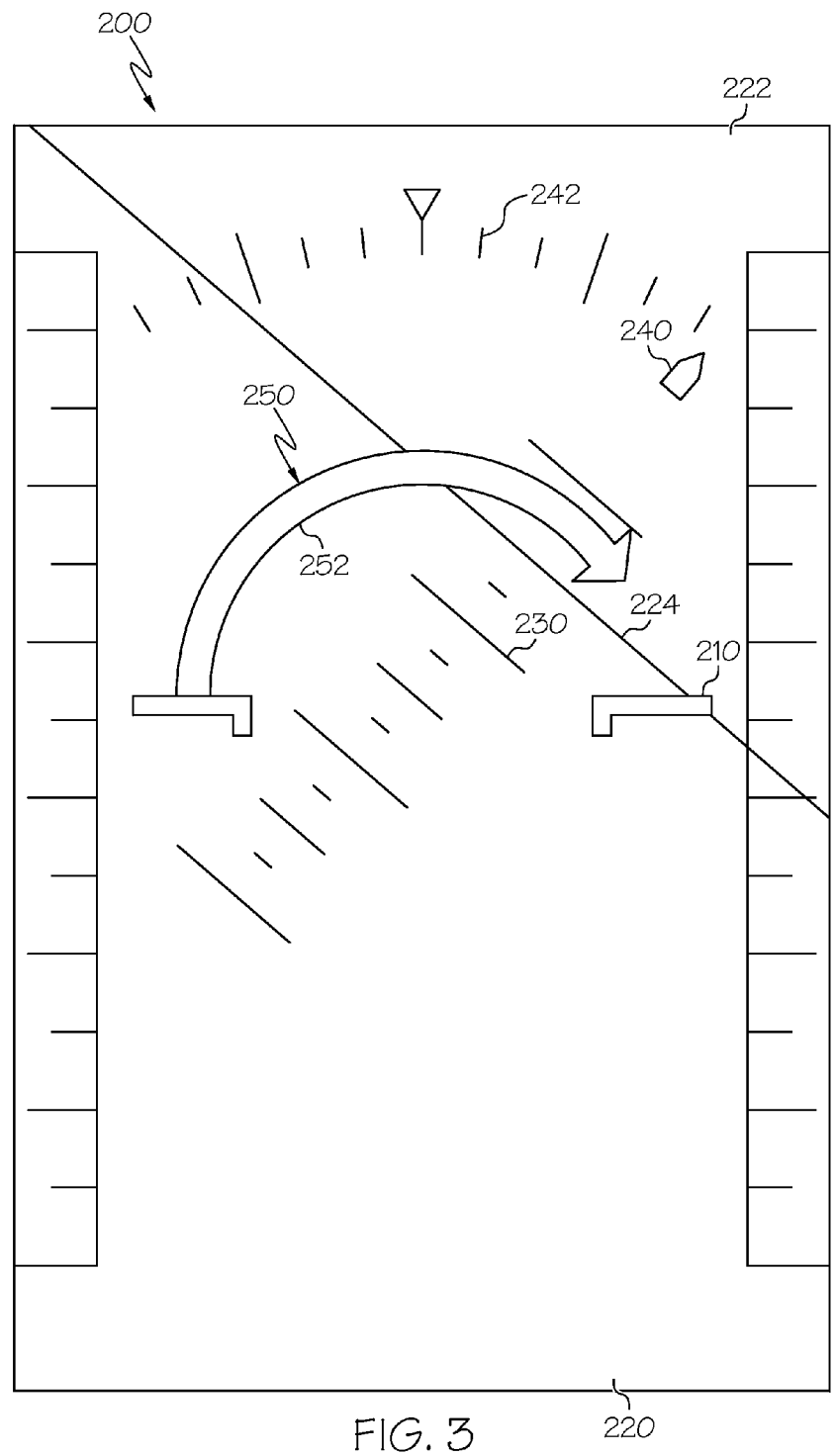
FIG. 3 is an image generated by the aircraft system of FIG. 1 subsequent to the image of FIG. 2 according to an exemplary embodiment.

FIGS. 2 and 3 depict a representative display image (or attitude indicator) 200 that may be displayed on the display device 130 (FIG. 1). As described below, FIG. 2 depicts the display image 200 in a first moment of time and FIG. 3 depicts the display image 200 in a subsequent, second moment of time to show the dynamic nature of the display image 200. In some embodiments, the display image 200 may be more static, e.g., the display image 200 may be represented by FIG. 2 or FIG. 3. However, as in some of the embodiments discussed below, the display image 200 may transition between the view in FIG. 2 to the view in FIG. 3.

Generally, display image 200 is an attitude indicator used to pictorially represent aircraft pitch and roll attitudes. The display image 200 includes "wings" or horizontal lines 210 with a dot between them representing the actual wings and nose of the aircraft. The display image 200 further includes an "attitude sphere" including regions 220 and 222, together with a horizon line 224 representative of the ground, the sky and the horizon, respectively. The display image 200 further includes a pitch tape 230 with a vertical scale that indicates the aircraft pitch attitude with respect to a horizontal plane and a roll angle pointer (or "sky pointer," "roll angle," "zero roll reference position") 240 indicates the roll attitude of the aircraft with respect to the roll scale 242. As such, the pitch tape 230 and roll angle pointer 240 indicate the current pitch and roll angle, respectively. Other symbology may include an altitude scale, a speed scale, and other aircraft symbology. Details of symbology or location of markings on the display image 200 (as well as the display images discussed below) may change from implementation to implementation.

As will now be described in greater detail, the display image 200 further displays roll symbology 250 generated in response to a roll angle alert condition. The roll symbology 250 is provided by the processing device 124 (FIG. 1) to indicate to the pilot the desired or correct direction of roll. In the example illustrated by FIGS. 2 and 3, the roll symbology 250 is in the form of an outlined, transparent solid curved arrow 252 with a base positioned at the wings 210. The symbology (or "arrow") 252 is curved in the direction of the attitude correction. In the exemplary embodiment of FIGS. 2 and 3, the arrow 252 has a circular arc, although other curved shapes may be provided.

As noted above, the arrow 252 may be dynamic, e.g., change appearance to improve situational awareness, as depicted in FIGS. 2 and 3. As such, the arrow 252 may initially extend from a length of approximately 90°, as shown in FIG. 2, to a length of almost 180°, as shown in FIG. 3. In one exemplary embodiment, the arrow 252 starts at a length of no less than 30°. In other embodiment, the arrow 252 may start at approximately 45° or more (from a wing) and increase in length at a fixed rate until either reaching a fixed angle (e.g., 135°), as shown, or to the roll angle pointer 240. Any suitable lengths and/or length differential may be provided, as necessary or desired for situational awareness. Upon reaching the maximum angle, as shown in FIG. 3, the arrow 252 may return to the initial position, as shown in FIG. 2, or to another predetermined position.

The arrow 252 may be any suitable color, and in some embodiments, the color of the arrow 252 may reflect the urgency of the roll angle alert condition. For example, the arrow 252 may be either yellow for a caution, red for a warning, and/or any suitable color based on, for example, the difference between the current roll angle and the desired roll angle. As an example, if the differential is between 45° and 55°, the arrow 252 may be displayed in yellow as a caution, and if the differential is above 55°, the arrow 252 may be displayed in red as a warning.

The rate of growth between the arrows 252 reflected in FIGS. 2 and 3 may also be considered. As one example, the transition between the arrows 252 in FIGS. 2 and 3 may be, for example, approximately 5°-15° per second until the maximum length is reached. In other words, during the intervening time periods between FIGS. 2 and 3, the arrow 252 may grow to a series of intermediate lengths, e.g., as a constant rate.

As noted above, the arrow 252 is orientated in the direction of the corrective roll to return to an appropriate attitude. The curved arrows discussed herein may increase the sense of rolling movement to the viewer. Any growth and/or movement discussed herein may increase the visibility and give a sense of the control movement needed to correct a situation. Additional consideration may include the processing limitations and/or capabilities of the display and processing device.

Figure 4:
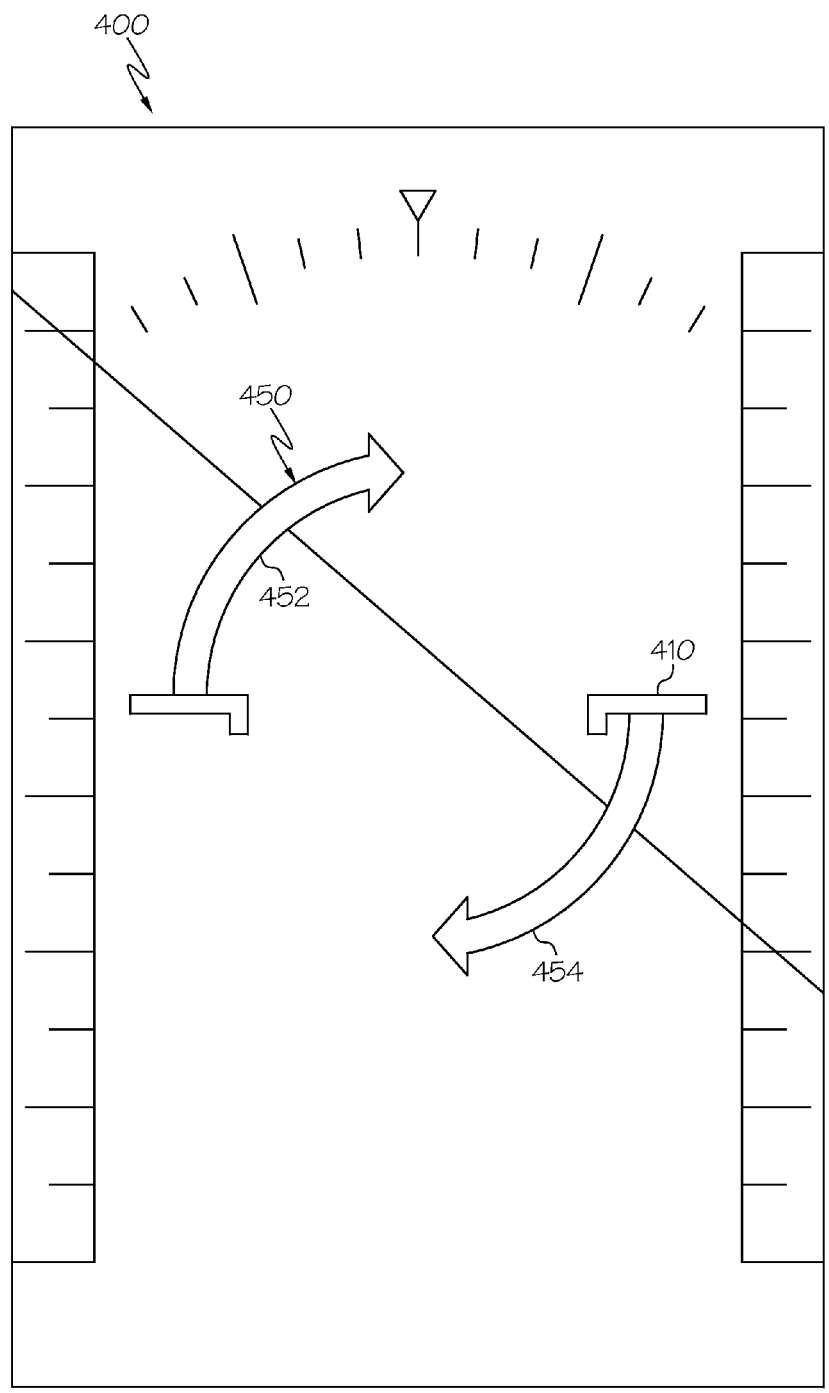
FIG. 4 is an image generated by the aircraft system of FIG. 1 according to an alternate exemplary embodiment.
Figure 5:
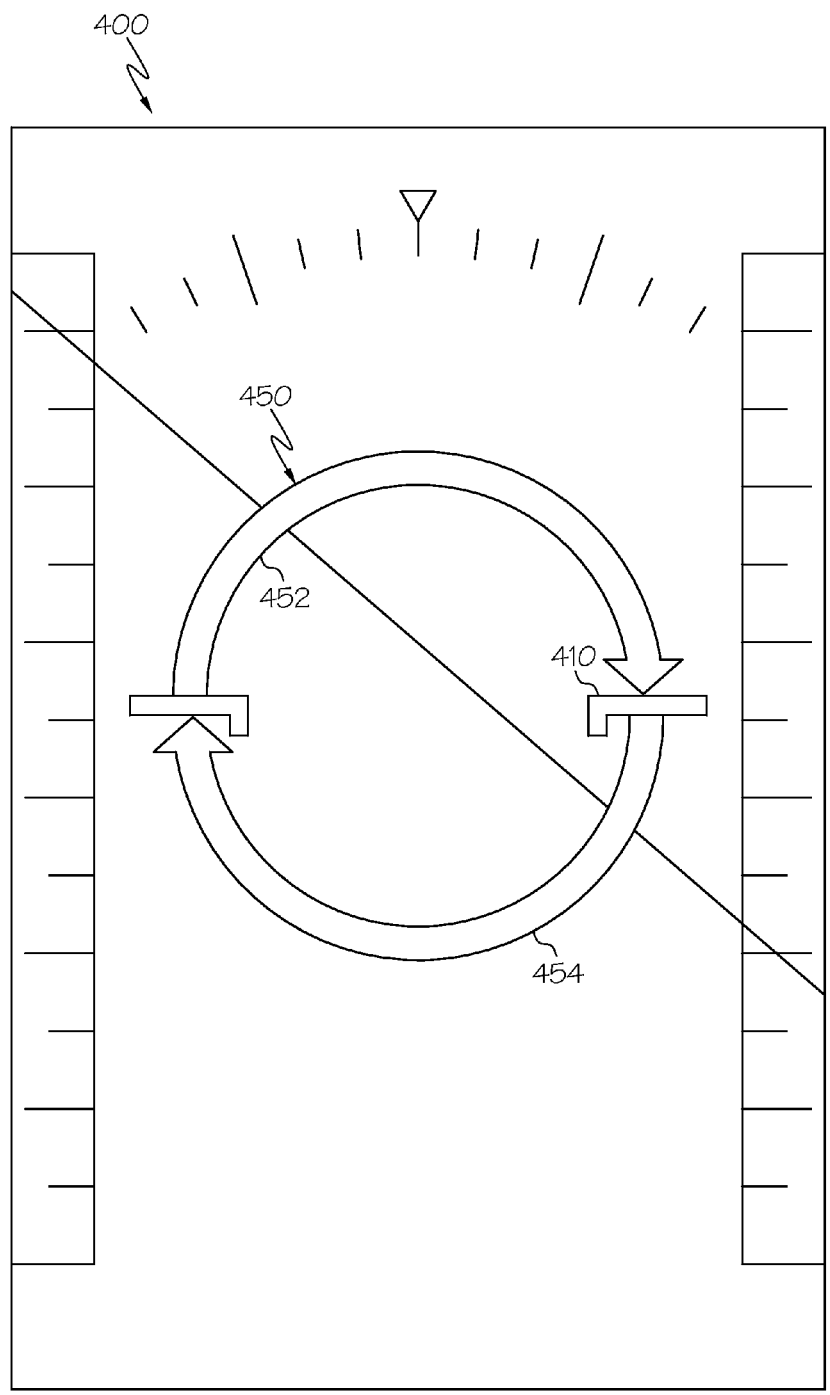
FIG. 5 is an image generated by the aircraft system of FIG. 1 subsequent to the image of FIG. 4 according to an alternate exemplary embodiment.

FIGS. 4 and 5 are images 400 generated by the aircraft system of FIG. 1 as an attitude indicator according to an alternate exemplary embodiment. Similar to the display image 200 of FIGS. 2 and 3, FIG. 4 depicts the image 400 in a first moment of time and FIG. 5 depicts the image 400 in a subsequent, second moment of time to show the dynamic nature of the attitude indicator. In some embodiments, the image 400 may be more static, e.g., the image 400 may be represented by FIG. 4 or FIG. 5.

As above, the image 400 further includes roll symbology 450. The roll symbology 450 may be provided by the processing device 124 (FIG. 1) to indicate to the pilot the desired or correct direction of roll. In the example illustrated by FIGS. 4 and 5, the roll symbology 450 is in the form of a first outlined, transparent curved arrow 452 with a base positioned at wings 410 and a second outlined, transparent curved arrow 454 with a base positioned at wings 410. In general, the second arrow 454 is generally a mirror image of the first arrow 452 about the wings 410. The arrows 452, 454 are curved in the direction of the attitude correction. As shown, the first arrow 452 is positioned above the wings 410, similar to the arrows 250 of FIGS. 2 and 3, and the second arrow 454 is positioned below the wings 410. The dual arrows 452, 454 may provide additional or enhanced situational awareness to the pilot of the aircraft.

Figure 6:
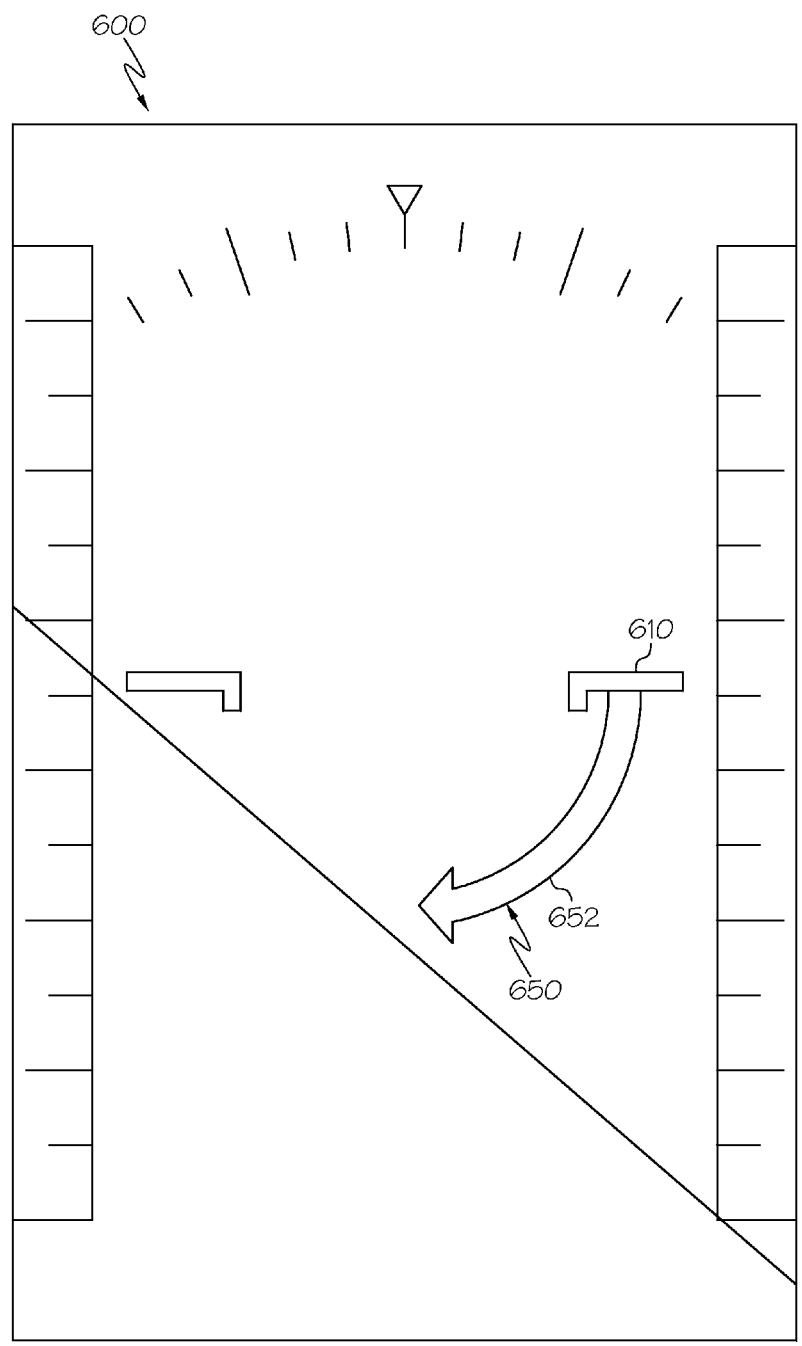
FIG. 6 is an image generated by the aircraft system of FIG. 1 according to a further exemplary embodiment.
Figure 7:
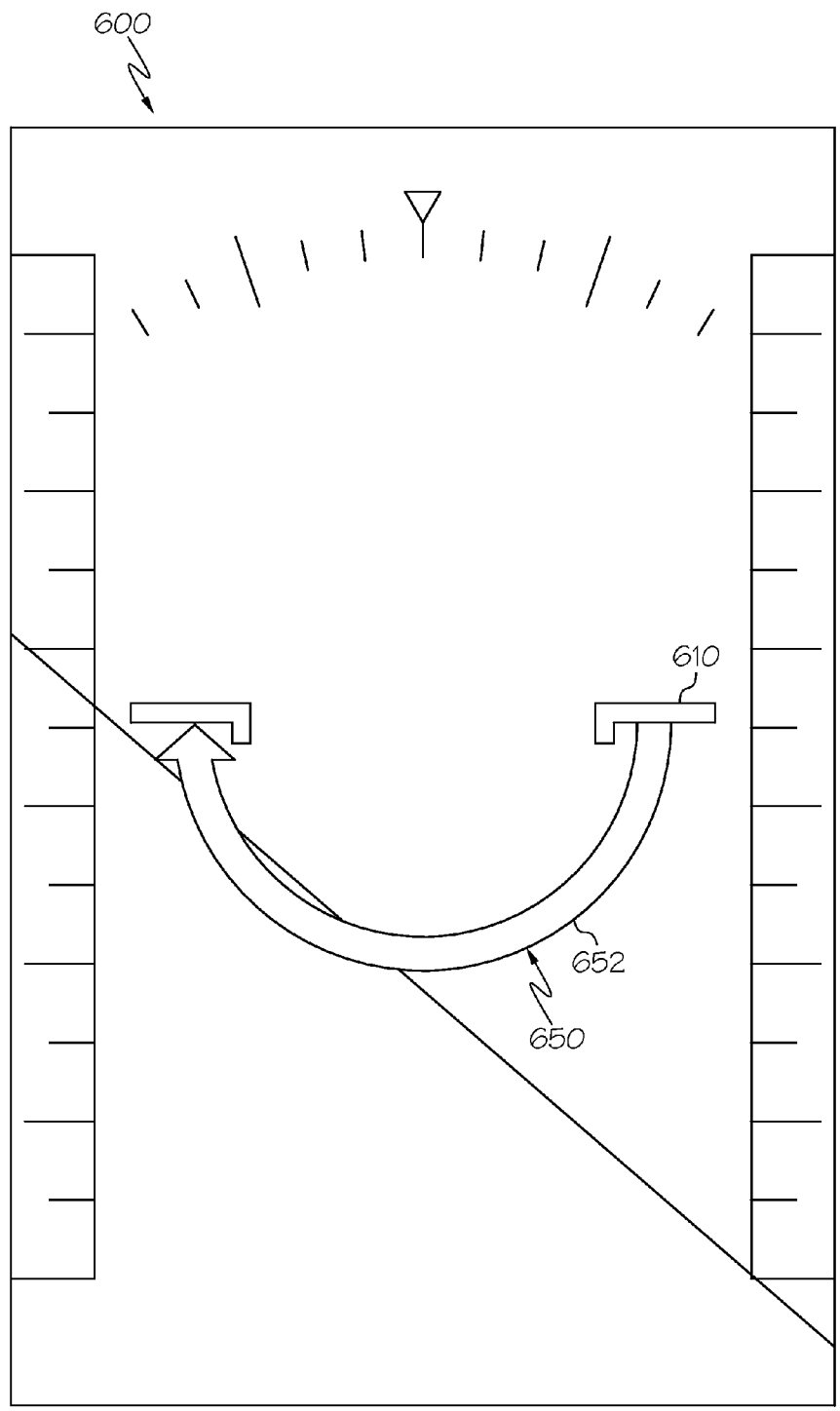
FIG. 7 is an image generated by the aircraft system of FIG. 1 subsequent to the image of FIG. 6 according to a further exemplary embodiment.

FIGS. 6 and 7 are a display image 600 generated by the aircraft system 120 of FIG. 1 as an attitude indicator according to an alternate exemplary embodiment. Similar to the display image 200 of FIGS. 2 and 3, FIG. 6 depicts the display image 600 in a first moment of time and FIG. 7 depicts the image 600 in a subsequent, second moment of time to show the dynamic nature of the attitude indicator. In some embodiments, the image 600 may be more static, e.g., the image 600 may be represented by FIG. 6 or FIG. 7.

As above, the display image 600 further includes roll symbology 650. The roll symbology 650 may be provided by the processing device 124 (FIG. 1) to indicate to the pilot the desired or correct direction of roll. In the example illustrated by FIGS. 6 and 7, the roll symbology 650 is in the form of an outlined, transparent curved arrow 652 with a base positioned at wings 610. The arrow 652 is curved in the direction of the attitude correction. In this embodiment, the arrow 652 is positioned below the wings 610, similar to the arrows 454 of FIGS. 4 and 5.

In some exemplary embodiments, the attitude symbology may be dependent on the pitch of the aircraft such that the system 120 displays some combination of the symbology 250, 450, 650 discussed above in reference to FIGS. 2-7 based on the pitch of the aircraft. As noted above in the discussion of FIG. 1, pitch angle information may be provided by attitude sensor 132.

In one exemplary embodiment, if the aircraft has a generally neutral pitch (e.g., between −5° pitch and 15° pitch), the system 120 may generate symbology for the attitude indicator during a roll angle alert condition such as that shown in FIGS. 4 and 5. In this situation and as shown in FIGS. 4 and 5, the system 120 may generate images 400 with symbology that includes dual roll arrows 452, 454 above and below the wings 410.

However, if the aircraft has a nose down pitch (e.g., less than −5°), the system 120 may generate symbology for the attitude during a roll angle alert condition such as that shown in FIGS. 2 and 3. In this situation and as shown in FIGS. 2 and 3, the system 120 may generate a display image 200 with symbology 250 that includes a roll arrow 252 positioned above the wings 210.

If the aircraft has a nose up pitch (e.g., greater than +15°), the system 120 may generate symbology for the attitude indicator during a roll angle alert condition such as that shown in FIGS. 6 and 7. In this situation and as shown in FIGS. 6 and 7, the system 120 may generate images 600 with symbology 650 including a roll arrow 652 positioned below the wings 610.

As such, in a typical, neutral the situation, dual arrows (e.g., arrows 452, 454) may maximize the roll recovery maneuver and minimize exceedances in the pitch axis. However, if the aircraft is in a nose up or nose down situation, the position of the selected arrows (e.g., arrows 252 or arrows 652) may mitigate any inclination or tendency for a pilot to "follow" the arrow by removing the arrow that may otherwise lead to a inappropriate maneuver. In other words, in a nose down situation, a pilot having a tendency to follow a roll arrow positioned under the wings may exacerbate the pitch situation. As such, in this embodiment, the system 120 does not display the second roll arrow in such situations based on the pitch.

Figure 8:
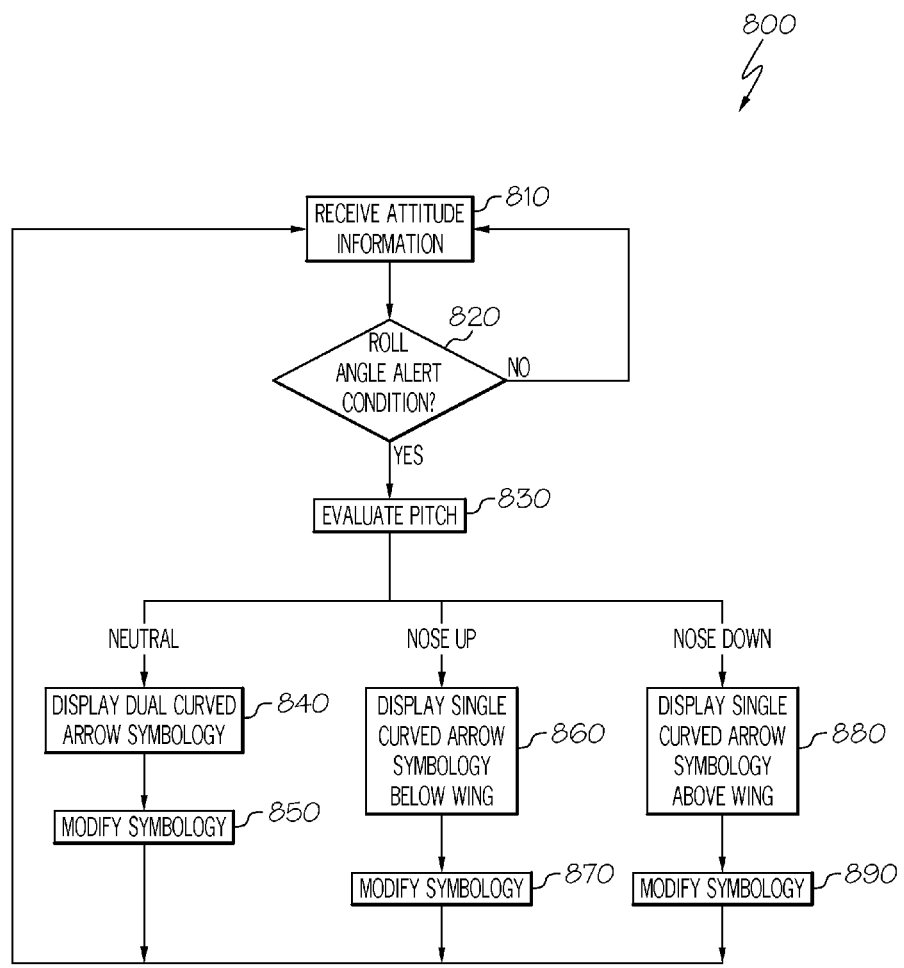
FIG. 8 is a flow chart for a method of displaying an aircraft attitude adjustment in accordance with an exemplary embodiment.

In a further exemplary embodiment, the system 120 discussed above may be used to implement a method 800 for displaying attitude correction, as shown in the flow chart of FIG. 8. In a first step 810, attitude information is received, including roll angle information and pitch information, and in step 820, the current and desired roll angles are evaluated to determine if a roll angle alert condition exists. If the aircraft is not in a roll angle alert condition, the method 800 may return to step 810 to continue monitoring the roll angle of the aircraft. If the aircraft is in a roll angle alert condition, the method 800 proceeds to step 830. In step 830, the pitch of the aircraft is considered. If the aircraft has a neutral pitch, the method proceeds to step 840 in which dual, curved arrow symbology is provided to indicate the direction of corrective action. In step 850, the dual, curved arrow symbology is modified to increase visibility and situational awareness with respect to the corrective action. If the aircraft has a nose up pitch, the method 800 proceeds to step 860 in which curved arrow symbology underneath the wing symbology is provided to indicate the direction of corrective action while mitigating or correcting the pitch situation. In step 870, the arrow symbology is modified, e.g., lengthened, to increase visibility and situational awareness with respect to the corrective action. If the aircraft has a nose down pitch, the method 800 proceeds to step 880 in which curved arrow symbology above the wing symbology is provided to indicate the direction of corrective action while mitigating or correcting the pitch situation. In step 890, the arrow symbology is modified, e.g., lengthened, to increase visibility and situational awareness with respect to the corrective action. Subsequent to steps 850, 870, and 890, the method 800 returns to step 810 to continue monitoring the attitude characteristics of the aircraft.

The symbology discussed above may vary as necessary or desired. As an example, the arrows depicted above are generally outlined and transparent, although in other embodiments, the arrows may be semi-transparent, solid arrow, and/or have dynamic transparencies. An outlined arrow may prevent or mitigate clutter with other aspects of the display. Similarly, the arrows may have varying lengths, starting positions, and ending positions. In one exemplary embodiment, the arrow may grow to a preset limit, such as nominally 135°, and in another exemplary embodiment, the arrow may grow to a roll angle pointer (e.g., 0° of roll). In one exemplary embodiment, an arrow base is positioned at the wing tip and the arrow grows such that the tip extends from about 45° to 90° at approximately 5°-15° per second. In some embodiments, the symbology at the wings may tie the arrow to the rolling axis of the aircraft. In a further embodiment, at least one arrow is set at about half of the roll arc and spans +/−50°. In a further embodiment, the at least one arrow is approximately 82° in length, initially centered, and subsequently moved to tip at 90°. In a further embodiment, at least one arrow may have an initial bias in the direction of needed bank and grow beyond 90°. In a further embodiment, at least one arrow may have a base positioned at approximately −40° and the tip positioned at approximately 40°. In a further embodiment, at least one arrow may be outlined, centered on the wing, and initially start slightly beyond 90° to avoid potential clutter with the pitch indication. The arrows may also have alternate arrow head shapes, including amore swept arrow head or square arrow head. The arrows may also have alternate outlined thicknesses, including a narrower or thicker thicknesses.

Accordingly, the exemplary embodiments discussed above may provide improved systems and methods for displaying attitude and attitude correction. In particular, the systems and methods may increase situational awareness by preventing and/or mitigating confusion, disorientation, and misinterpretation during a roll angle condition or a perceived roll angle condition.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle system comprising:
   a processor configured to receive data representative of a current attitude and a desired attitude and to generate display signals associated with the current attitude and the desired attitude, wherein the processor is configured to compare the current altitude to the desired altitude to determine a roll angle, the processor further configured to establish a roll angle alert when the roll angle exceeds a predetermined roll angle; and
   a display device configured to receive the display signals and operable to selectively render an image including roll angle alert symbology, the roll angle alert symbology including a first curved arrow, wherein the display device is configured to only display the roll angle alert symbology during the roll angle alert.

2. The vehicle system of claim 1, wherein the processor is configured to determine a roll angle correction direction, and wherein the first curved arrow is oriented in the roll angle correction direction.

3. The vehicle system of claim 1, wherein the first curved arrow is dynamically rendered to change appearance.

4. The vehicle system of claim 1, wherein the first curved arrow has a length of at least 30°.

5. The vehicle system of claim 1, wherein the first curved arrow has a length of at least 45°.

6. The vehicle system of claim 1, wherein the first curved arrow is dynamically rendered to grow in length over time.

7. The vehicle system of claim 1, wherein the first curved arrow grows from an initial length of between approximately 30° and approximately 45° to a final length of between approximately 90° to approximately 180°.

8. The vehicle system of claim 1, wherein the first curved arrow grows from an initial length to a final length at approximately a roll angle pointer.

9. A vehicle system comprising:
   a processor configured to receive data representative of a current attitude and a desired attitude and to generate display signals associated with the current attitude and the desired attitude; and
   a display device configured to receive the display signals and operable to selectively render an image including roll angle alert symbology, the roll angle alert symbology including a first curved arrow,
   wherein the image further includes wing symbology, and wherein the first curved arrow has a base at the wing symbology.

10. The vehicle system of claim 9, wherein the roll angle alert symbology further includes a second curved arrow, and wherein the first curved arrow is selectively positioned above the wing symbology and the second curved arrow is selectively positioned below the wing symbology.

11. The vehicle system of claim 10, wherein the current attitude includes a current pitch of the aircraft, and
   wherein the display device is configured to selectively render at least one of the first curved arrow and the second curved arrow based on the current pitch of the vehicle.

12. The vehicle system of claim 11, wherein, when the current pitch indicates a neutral pitch condition, the display device is configured to simultaneously display the first curved arrow and the second curved arrow,
   wherein, when the current pitch indicates a nose down pitch condition, the display device is configured to display only the first curved arrow, and wherein, when the current pitch indicates a nose up pitch condition, the display device is configured to display only the second curved arrow.

13. A vehicle display method, comprising the steps of:
receiving data representative of a current attitude and a desired attitude for a vehicle;
evaluating a roll alert condition of the vehicle;
displaying, during the roll alert condition, a first curved arrow on an attitude indicator; and
modifying, during the roll alert condition, an appearance of the first curved arrow, wherein the displaying step further includes displaying, during the roll alert condition, a second curved arrow on the attitude indicator.

14. The method of claim 13, further comprising the step of determining a roll angle correction direction; and wherein the displaying step includes orienting the first curved arrow in the roll angle correction direction.

15. The method of claim 13, wherein the modifying step includes dynamically rendering the first curved arrow to change appearance, and wherein the displaying step includes displaying the first curved arrow with a length of at least 30°.

16. The method of claim 13, wherein the image further includes wing symbology, and wherein the displaying step includes displaying a base of the first curved arrow at the wing symbology.

17. The method of claim 13, wherein the displaying step includes displaying the first curved arrow selectively positioned above the wing symbology and displaying the second curved arrow selectively positioned below the wing symbology.

18. The method of claim 17,
further comprising the step of evaluating a current pitch, and wherein the displaying step includes,
when the current pitch indicates a neutral pitch condition, simultaneously displaying the first curved arrow and the second curved arrow,
when the current pitch indicates a nose down pitch condition, displaying only the first curved arrow, and
when the current pitch indicates a nose up pitch condition, displaying only the second curved arrow.

* * * * *